Patented Feb. 19, 1952

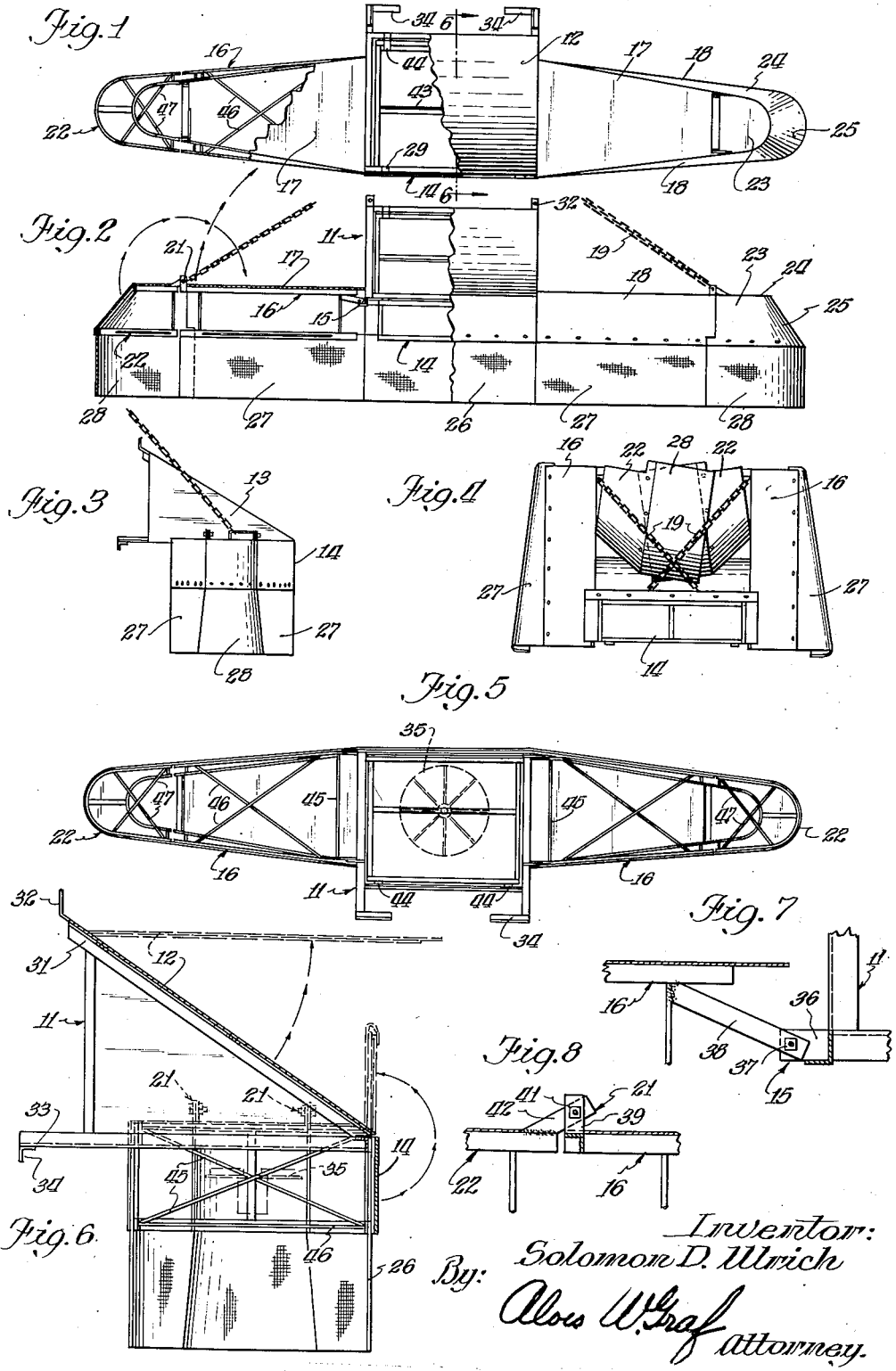

2,586,492

UNITED STATES PATENT OFFICE 2,586,492

FERTILIZER SPREADER HOOD

Solomon D. Ulrich, Shelbyville, Ill., assignor to Aubrey L. Jones, Stewardson, Ill.

Application October 18, 1949, Serial No. 121,929

2 Claims. (Cl. 275—8)

The present invention relates to fertilizer spreaders, and more particularly to a fertilizer spreader hood for controlling the distribution of fertilizer from the spreader.

Nowadays it is common practice to engage a service company to fertilize the farm land by spreading lime, phosphate and similar materials as requested. The service company has a number of fertilizers spreaders for this purpose, each of which consists of a trunk having a hopper filled with the selected material. At the end of the hopper at the rear of the truck, there is provided a scattering device. In the bottom of the hopper there is located an endless conveyor belt which progressively moves the material to the scattering device.

In the use of these fertilizer spreaders, it has been found that there frequently is an uneven distribution of the material, and in other cases, a loss of the material due to cross winds while the spreader traverses the land. It, therefore, would be desirable to provide some means for insuring an even application of the material to the surface of the land. For this purpose a hood of some kind might be applied to the spreader, but such hood would have to extend considerably to the right and left of the truck, which therefore, would make the truck unwieldy and difficult to handle when the truck is on the highway obtaining another load of material. Accordingly, and in accordance with the present invention, an improved type fertilizer spreader hood has been devised which permits the truck to be moved on the highway without undue interference to the usual traffic.

It, therefore, is an object of the present invention to provide an improved fertilizer spreader hood which may be readily attached to a fertilizer spreader.

A still further object of the present invention is to provide an improved fertilizer spreader hood which is collapsible.

A still further object of the present invention is to provide an improved fertilizer spreader hood so arranged that the major portions thereof are readily demountable.

Other and further objects of the present invention subsequently will become apparent from reference to the following description taken in conjunction with the drawing, wherein Figure 1 is a plan view of a fertilizer spreader hood;

Figure 2 is a rear view, partially broken away;

Figure 3 is an end view;

Figure 4 is a phantom view showing the collapsed position;

Figure 5 is a bottom view of the framework;

Figure 6 is an end view of the framework;

Figure 7 is a detailed view of one of the hinge constructions; and

Figure 8 is a detailed view of another of the hinged constructions.

Referring in Figures 1, 2 and 3, it will be seen that a fertilizer spreader hood constructed in accordance with the present invention consists of a plurality of units. A frame 11 is covered with sheet metal so as to have a sloping top cover 12. The frame 11 has triangular side portions 13 and a depending rear wall 14. Hingedly connected to the frame 11 by means of hinges 15 on each side of the frame is an elongated frame 16 having a top 17 and sloping sheet metal sides 18. Adjacent each end of the frame 16, suitable means is provided for the attachment of a chain or wire cable 19, the other end of which is adapted to be connected or fastened to the body of the fertilizer spreader truck.

By means of hinges 21, outer extremity frames 22 are connected to the frame 16. The outer extremity frames 22 each has a cover 23, sloping sides 24 and a rounded end 25. The various frames 11, 16 and 22 along their bottom edges support a plurality of curtains 26, 27 and 28 which extend from the frames to the vicinity of the top of the soil.

The depending rear frame 14 is connected to the frame 11 by hinges 29. This is arranged, as may be seen from Figure 6 and Figure 4, so that member may be moved through 180° when the unit is folded to permit the truck to be moved down the highway.

The frame 11 has a pair of angle irons 31 which extend upwardly at an angle and terminate in aperture ears 32 for receiving bolts secured to the tail gate or rear portion of the spreader chassis. The frame 11, as is apparent from Figure 6, also has horizontal angle irons 33 which are provided with transversely arranged angle iron extensions 34 which engage the rear portion of the truck body or chassis. This central frame 11, which is partially covered by sheet metal, therefore, partially encloses the scattering device 35 shown in dotted lines in Figures 5 and 6. The frame 11 on each side is provided with extension ears or apertured lugs 36 for receiving a bolt 37 which passes through an arm 38 which is welded to the frame 16 as may be seen from Figure 7. This member constitutes the hinge 15, which is readily separable so that the frames 16 and 22 are readily demounted from the frame 11 for such periods of use where the loader does not require the use of a hood, as in the case where limestone is being distributed.

To facilitate the folding operation whereby the frame 22 is rotated relative to the frame 16, there is provided a hinge 21 shown in detail in Figure 8. The frame 16 has an upstanding apertured lug 39 which is engaged by a bolt 41 passing through an angularly disposed lug which is welded to the frame 22.

In order to provide for ready inspection of the scattering device 35 the sheet metal cover 12 of the frame 11 is mounted on a cover frame 43 which is hinged at 44, as may be seen from Figure 1. The cover 12, therefore, may be lifted as indicated by the dotted line representation in Figure 6, so as to provide access to or inspection of the scattering device 35. The dotted line representation in Figure 6 also shows the manner in which the rear wall 14 may be moved through 180° and the depending canvas apron 26 is then folded inwardly as the initial step in folding or collapsing the spreader hood as indicated by the phantom view in Figure 4. In that figure, it will be noted that the chains or cables 19 are crossed and secured to the end frame 14 to hold the assembly in the desired position so as to occupy a minimum of space.

As is apparent from the drawing, each of the frames 11, 16 and 22 is fabricated from angle irons. While the central frame 11 is made of fairly substantial angle irons, the remaining frames preferably are made of lighter weight angle irons. To further insure reasonable rigidity, the frame 16 at the end adjacent the frame 11 is provided with crossed bracing bars 45. The frame 16 in the horizontal plane is provided with crossed bracing bars 46 which extend between the lowermost members of the frame 16. A similar arrangement of crossed bracing bars or rods 47 is provided for the lowermost frame portion of the frame 22.

While for the purpose of illustrating and describing the present invention, a certain embodiment has been shown in the drawing, it is to be understood that the invention is not to be limited thereby since such variations in the construction and in the components employed are contemplated as may be commensurate with the spirit and scope of the invention set forth in the accompanying claims.

What is claimed is:

1. A fertilizer spreader hood adapted to be attached to the rear of a fertilizer spreader having a rotary, disk-type scattering device, a sheet metal covered frame connected to said spreader to partially enclose said scattering device, said frame having a rectangular sloping top covered with sheet metal, each side of said frame being partially covered by a substantially triangular metal sheet the bottom edge of which is located above the plane of rotation of the scattering device, and a rectangular rear wall of sheet metal hingedly depending below the bottoms of said triangular side sheets, a pair of detachable hinged extension frames each connected at one end thereof to one of the sides of said first frame below the triangular metal sheets, said frames each having an elongated trapezoidal top and sloping sides of sheet metal, an end frame hingedly connected to each of said extension frames, each end frame having a flat top, sloping sides and a curved end of sheet metal, each extension frame having a trapezoidal cross-section at any plane perpendicular to the longitudinal axis of said frame, and a plurality of flexible support members one of which is attached to the extremity of each of said hinged extension frames and being adapted to be secured to the rear of the fertilizer spreader for stabilizing said spreader hood during operation with the extension and end frames in lowered, aligned relationship for combining with the central frame and its depending rear wall to define an elongated, open-bottomed chamber containing only the scattering device, said spreader hood being arranged to be folded so that said rear wall and said hinged extension frames assume a substantially perpendicular position with the end frames folded about and with their top walls abutting portions of the top walls of their respective extension frames for disposing said end frames in substantially parallel relationship with the extension frames above the sloping top of the first mentioned sheet metal covered frame, for disposing said hood entirely above the plane of rotation of said scattering device.

2. A pulverulent material spreader hood device adapted to be attached to the rear of a conventional limestone spreader which includes a material hopper having a discharge port at the rear end of the spreader, and a rotary disk-type material distributor which projects beyond and is secured to the read end of the spreader and is positioned below the discharge port, said device comprising a central frame including a pair of duplicate side panels each including a downwardly and rearwardly inclined upper edge, a substantially vertical front edge and substantially horizontal bottom edge, a top panel spanning the downwardly inclined upper edges of the frame and side panels, said top panel hingedly secured along its forward edge to said frame for controlling access to the interior of a central compartment defined by said frame and side panels, means for securing the central frame on the rear end of a conventional spreader to completely enclose its discharge port and for disposing the bottom of said frame and the bottom edges of its side panels entirely above the plane of rotation of the distributor, a rear panel hingedly secured to the lower rear edge of said central frame in spanning relationship with said top and side panels, a pair of duplicate extension frames each including front, top and rear walls, means hingedly connecting the upper innermost ends of each of the extension frames to one of the sides of the central frame adjacent the bottom edge of a side panel, and a pair of end frames each including front, top, rear and outer end walls, means hingedly connecting the upper inner end of each end frame to the upper outer end of each extension frame, means attached relative to said extension and end frames adjacent their pivotal connection and being adapted to engage portions of the spreader for supporting said extension and end frames in lowered, axially aligned position for combining with said central frame to define an elongated open-bottomed chamber containing only the distributor, substantially imperforate flexible means depending from the lower bottom-defining edges of the extension and end frames and from the lower, bottom-defining edge of said rear panel, said flexible means having extreme free and unobstructed lower edge portions, and means for supporting said extension frames and rear panel in elevated substantially vertical position and with said end frames folded about and with their top walls abutting portions of the top walls of their respective extension frames for disposing said end frames in nested relationship above said central frame, for adapting the spreader for distribution of free-flowing solid materials such as limestone.

SOLOMON D. ULRICH.

REFERENCES CITED

The following references are of record in the file of this patent:

UNITED STATES PATENTS

| Number | Name | Date |
|---|---|---|
| 772,941 | Kefauver | Oct. 25, 1904 |
| 896,178 | Tuttle | Aug. 18, 1908 |
| 1,616,303 | Campbell | Feb. 1, 1927 |
| 1,668,516 | Litchfield et al. | May 1, 1928 |
| 1,770,707 | McDow | July 15, 1930 |
| 2,120,169 | Baughman | June 7, 1938 |
| 2,204,099 | Allgrunn | June 11, 1940 |
| 2,281,212 | Stoltzfus | Apr. 28, 1942 |
| 2,307,313 | Wilson | Jan. 5, 1943 |
| 2,350,476 | Richey | June 6, 1944 |
| 2,500,681 | Hoffstetter | Mar. 14, 1950 |

FOREIGN PATENTS

| Number | Country | Date |
|---|---|---|
| 584,809 | Great Britain | Jan. 23, 1947 |